UNITED STATES PATENT OFFICE.

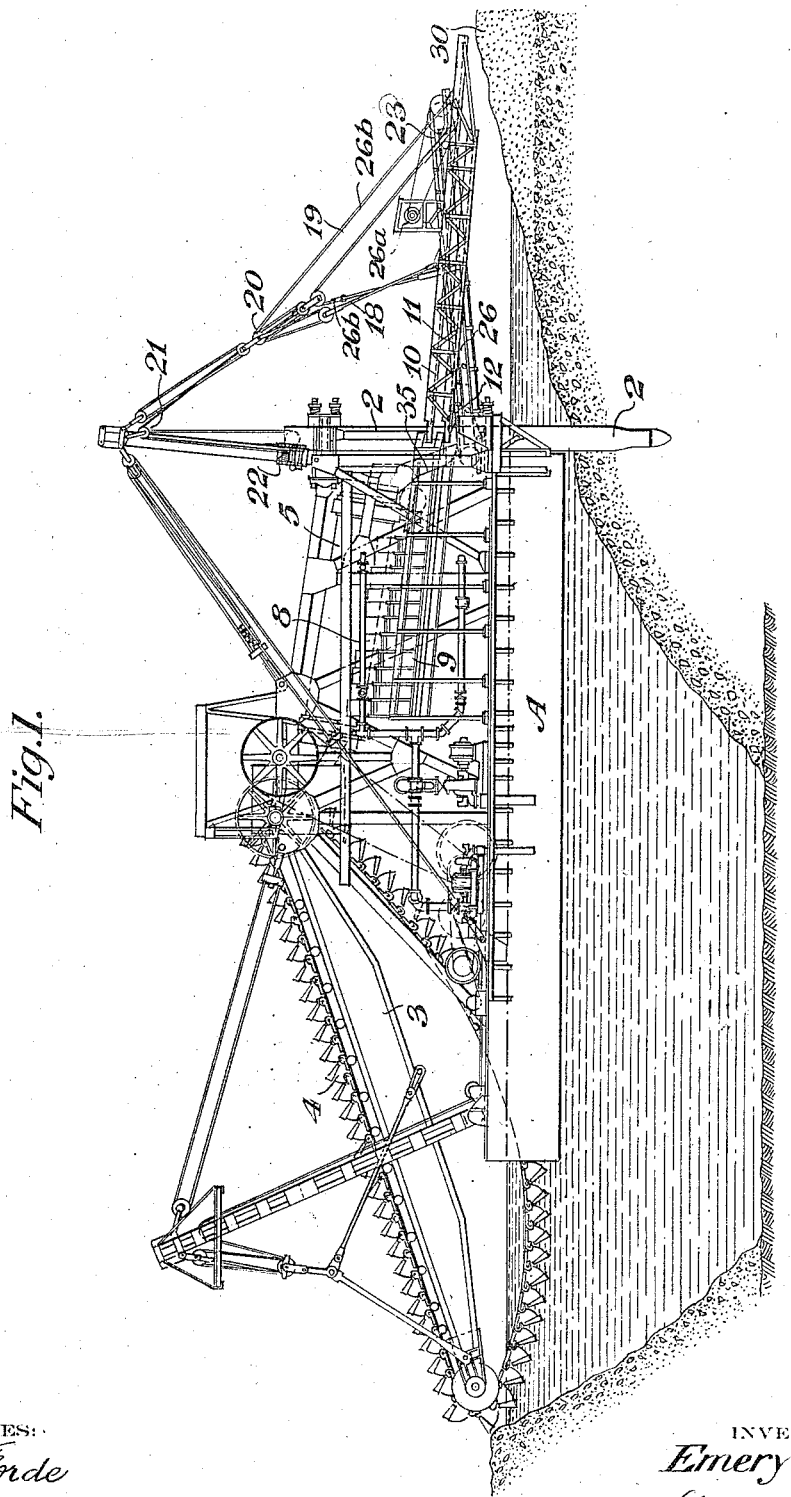

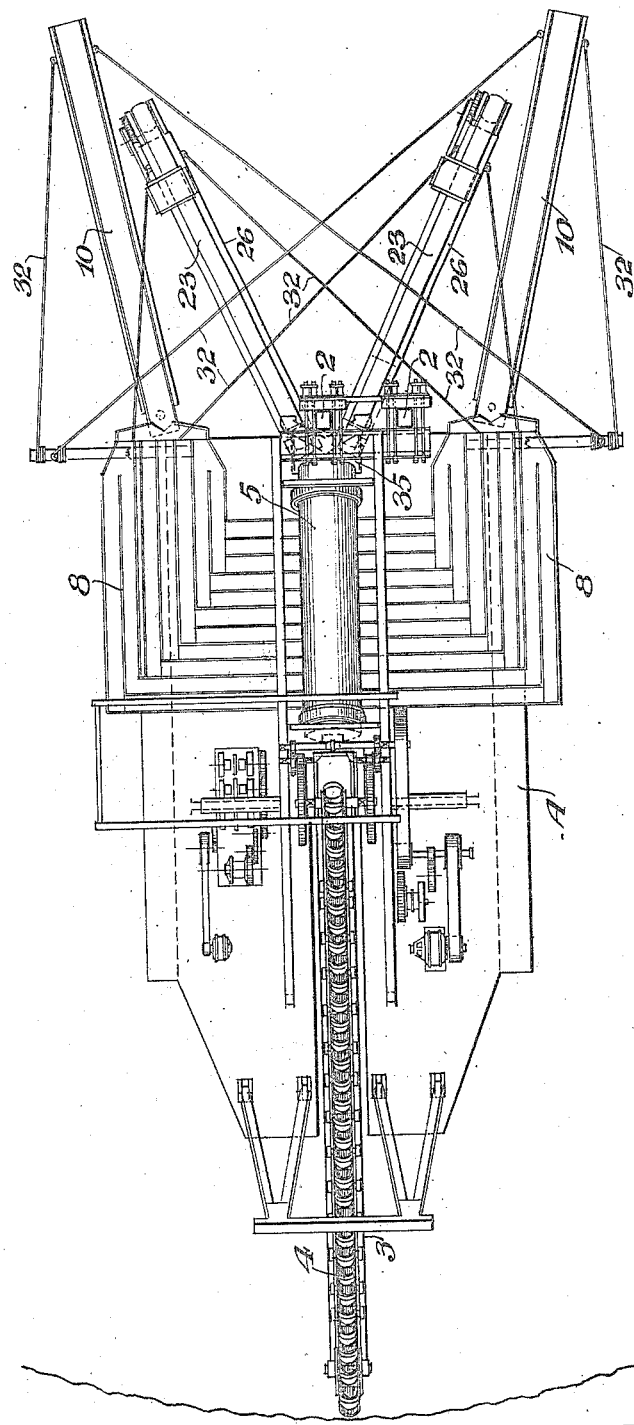

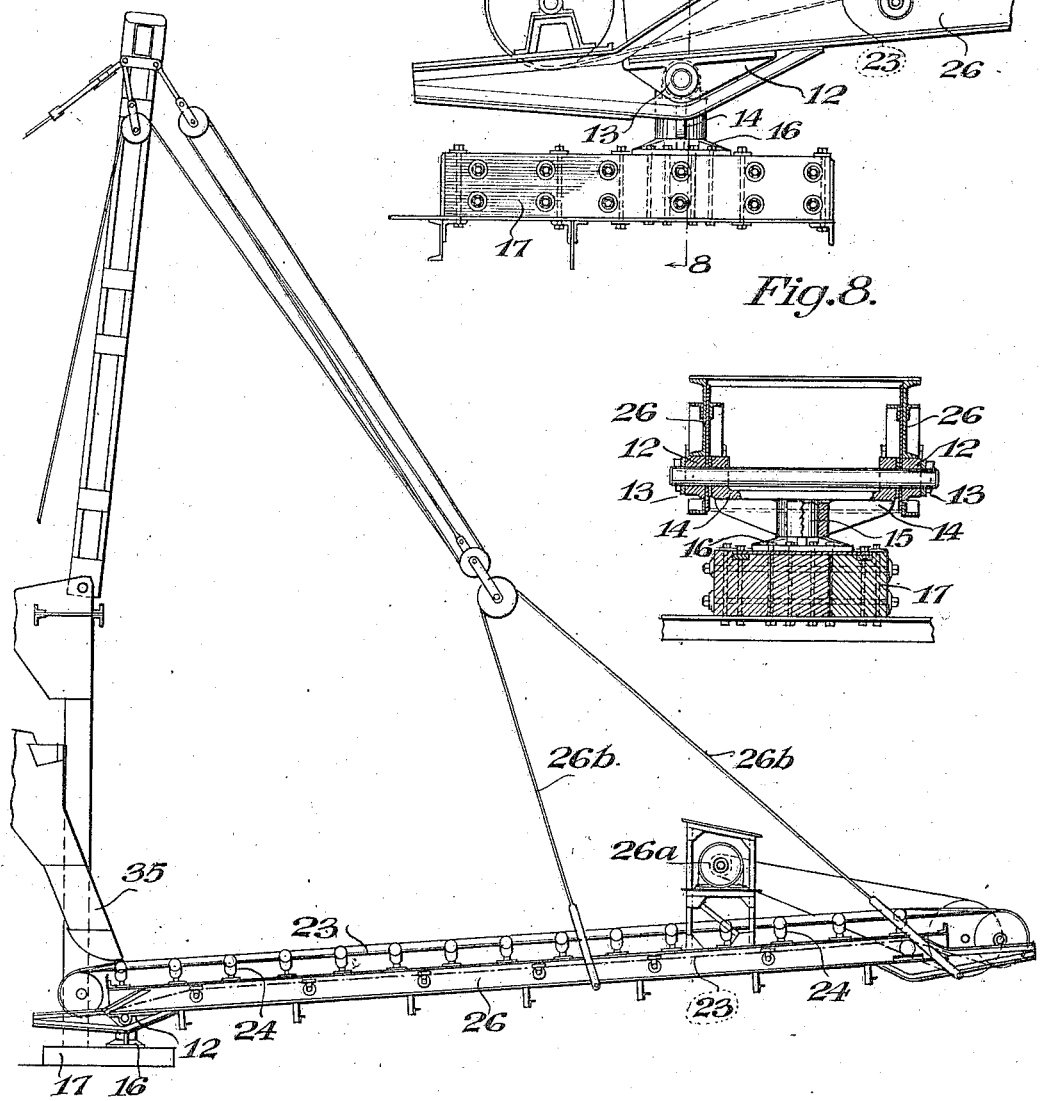

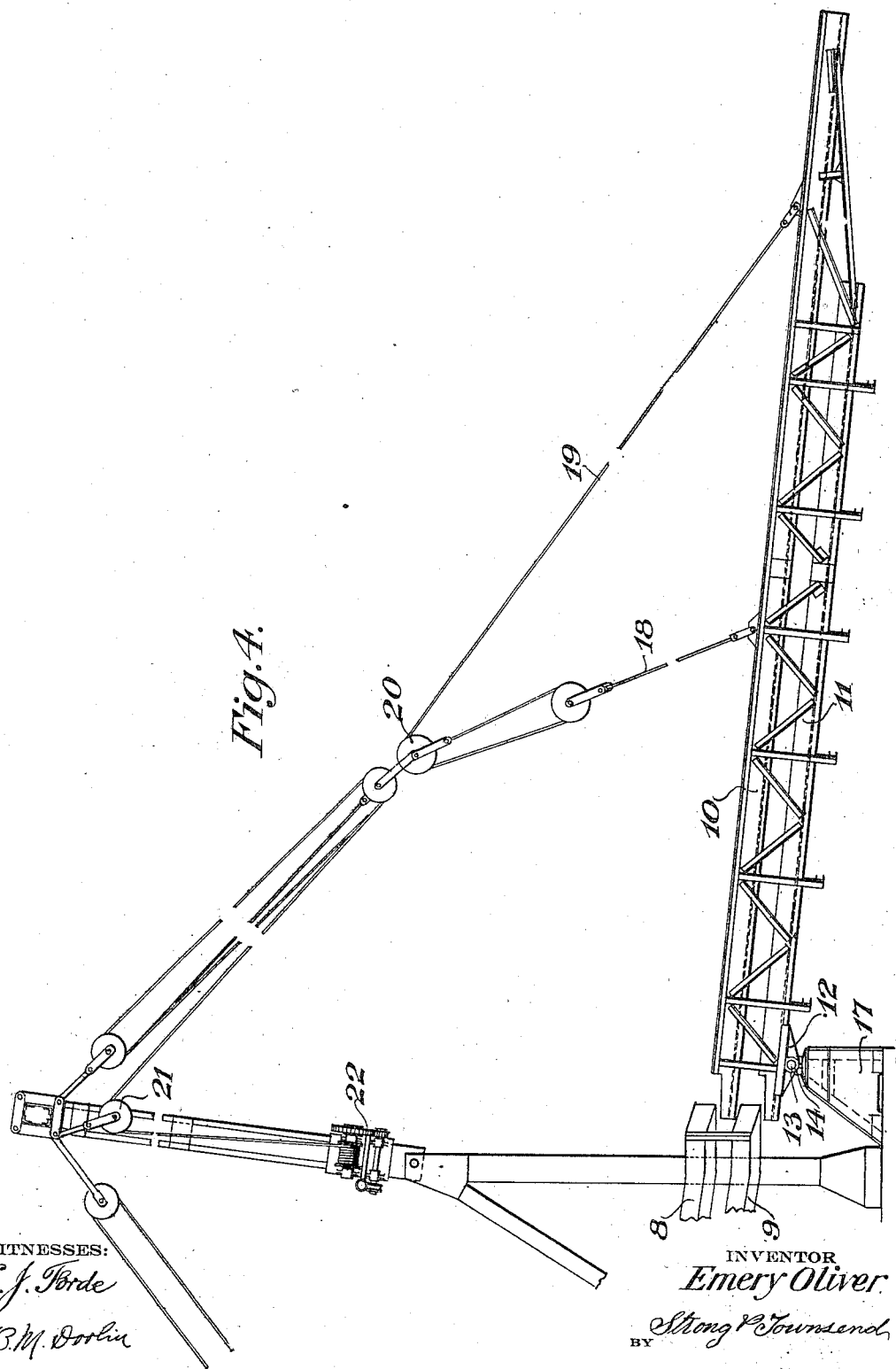

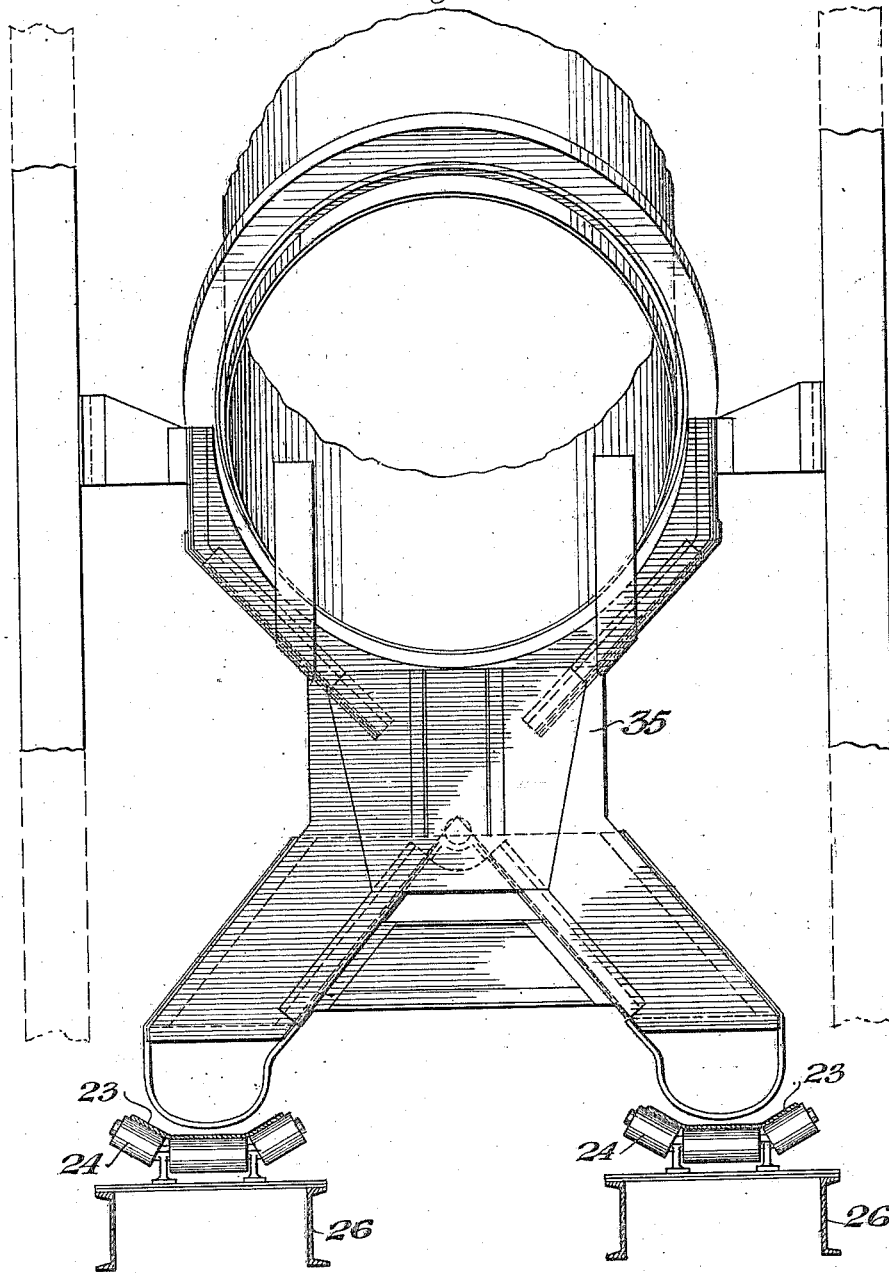

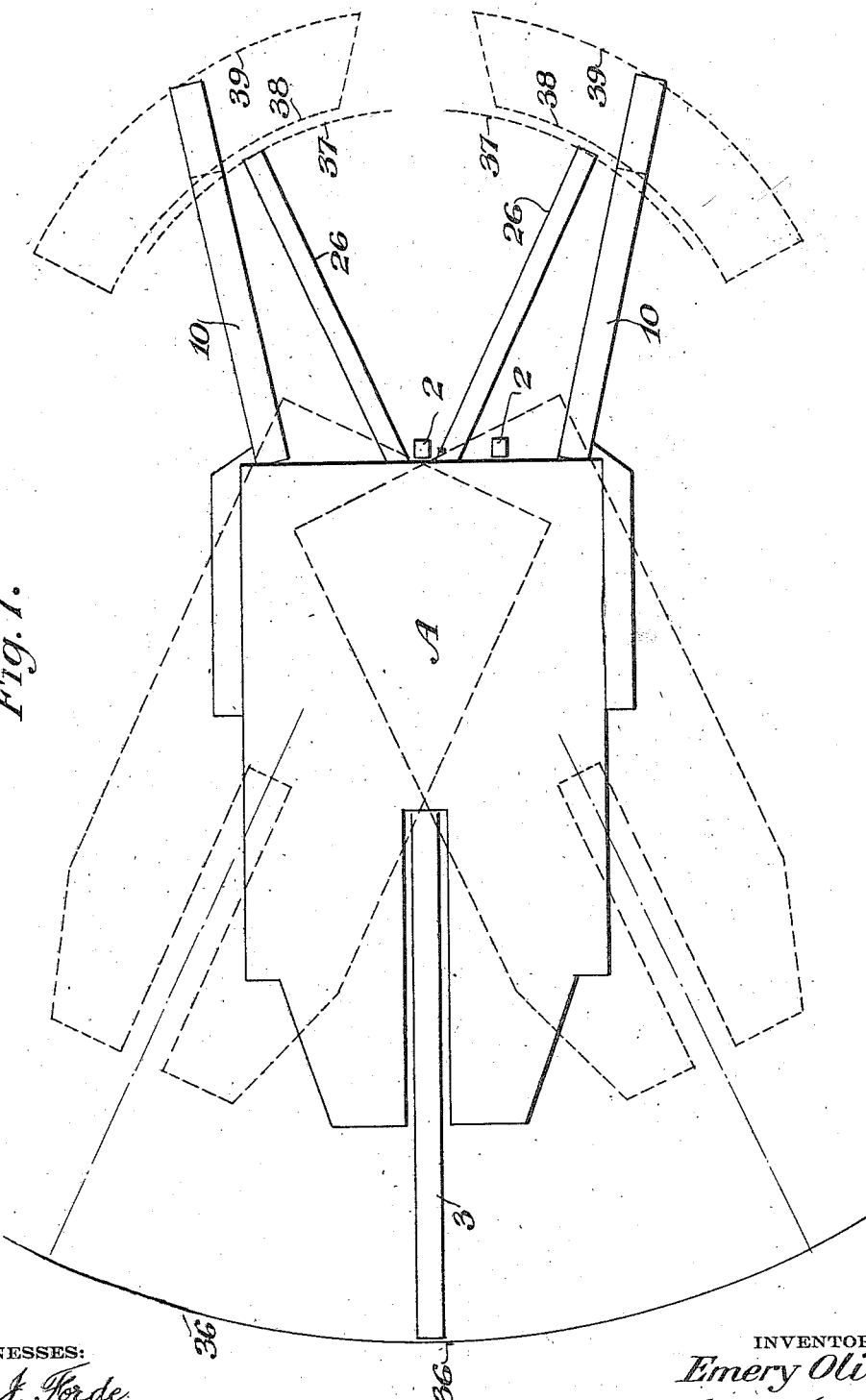

EMERY OLIVER, OF SACRAMENTO, CALIFORNIA, ASSIGNOR TO NATOMAS COMPANY OF CALIFORNIA, OF NATOMA, CALIFORNIA, A CORPORATION OF CALIFORNIA.

METHOD AND APPARATUS FOR RECLAIMING DREDGED LAND.

1,228,959.   Specification of Letters Patent.   Patented June 5, 1917.

Application filed December 7, 1915. Serial No. 65,489.

*To all whom it may concern:*

Be it known that I, EMERY OLIVER, a citizen of the United States, residing at Sacramento, in the county of Sacramento and State of California, have invented new and useful Improvements in Methods and Apparatus for Reclaiming Dredged Land, of which the following is a specification.

This invention relates to a method and an apparatus for reclaiming land which has been worked by placer gold dredges; the object being to restore the land as far as possible to its original available condition before it was torn up and to accomplish this restoration practically simultaneously with and as a part of the initial dredging operation. In other words, by a special type of dredger which I term a resoiling dredge, I am able to deposit the dredged material in such a manner that the larger rocks together with a portion of the fines are laid at the bottom of the pit formed by the excavations of the dredge, and the remaining fines deposited on top of rocks, so as to leave the ground now barren of its metalliferous values practically in readiness for the planting of orchards and for other uses of husbandry.

The idea of the present dredge is to replace the ground as it was in its original state. This is made possible by means of two short stackers, which carry the rocks from the initial separating devices on the dredge, and two long double-banked tail sluices which carry a mixture of fine material and water from the concentrators and tables. The material from the lower bank of the tail sluices falls in a path a short distance back of the path where the rock falls. The top bank of each tail sluice deposits its contents as far back as practical. These stackers and tail sluices can be adjusted either in a horizontal or vertical plane so that the material can be spread over any area that is necessary for successful operation.

Having reference to the accompanying drawings:

Figure 1 is a side elevation of the dredge.

Fig. 2 is a plan view of same.

Fig. 3 is an enlarged side elevation of one of the stackers.

Fig. 4 is an enlarged side elevation of one of the double-deck tail sluices.

Fig. 5 is an enlarged side elevation of one of the supports upon which the inner ends of the tail sluices and stackers are supported.

Fig. 6 is an end view of the distributing hopper for the stackers.

Fig. 7 is a diagrammatic view of the swinging movement of the dredge about the spud.

Fig. 8 is a section on line 8—8, Fig. 5.

Referring to the drawings in detail, A indicates the hull or barge of the dredge, and 2 the spuds about which it is adapted to swing. Mounted on the forward end of the barge is the ladder 3 which carries the continuous bucket chain 4 that digs the material to be treated and elevates it to a rotating screen 5 where the fines are separated from the coarser rocks and gravels.

Located interior of the revolving screen is a water pipe supplied from a high pressure pump. The water passing through a number of nozzles in the pipe washes the material in the screen as it rotates and insures a complete removal of all the fines less than one-half inch in diameter through the screen into a distributing box which diverts all the fines equally to the double deck sluices or tables where the gold is removed in any suitable manner by riffle action and amalgamation. The fines are then discharged and distributed in a manner hereinafter to be described.

The manner and means by which the distribution of the fines discharging from the double decks together with the coarser rocks and gravels discharging from the screen comprises the subject matter of the present application. This is accomplished as follows:

The present dredge is provided with double decks containing riffles, amalgamating tables or the like for the purpose of removing the gold or values from the fines. These tables indicated at 8 and 9 are arranged in pairs on each side of the revolving screen. Mounted adjacent the discharge end of the double decks on one side of the stackers is a double deck tail sluice. The upper of these indicated at 10 receives the fines discharging from the deck 8, while the lower indicated at 11 receives the discharge from the lower deck 9. These tail sluices are supported by steel-trussed frames of suitable construction, which in turn are supported at their inner ends by brackets 12, which are pivotally mounted, as at 13 in fork-shaped brackets 14; these fork-shaped brackets are secured on the upper end of pins 15, which are turnably mounted in pedestals 16 secured on elevated base members 17 of suitable construction.

The outer end of the trussed arm or frame which carries the tail sluices 10 and 11 is hung by cables 18 and 19, passing through shives 20 and 21 to a winch 22, and may in this manner be raised and lowered to suit conditions.

Referring to the drawings, it will be seen that the upper sluice 10 is considerably longer than the lower sluice 11. This is of considerable importance and will later be described.

From the plan view shown in Fig. 2, it will be seen that two pairs of tail sluices have been provided, and it will further be seen that two stackers have been provided; this also forms one of the important features of the present invention, as it permits a means by which the separated tailings, that is the coarse and the fines may be equally and evenly distributed to leave the ground when replaced as level as possible.

The tailing stackers here shown are constructed in the usual manner, that is an endless conveyer belt 23 passing over a plurality of idlers 24, supported by a suspended steel ladder 26 and driven by a motor 26$^a$ and reduction gears, is provided.

The inner ends of the trusses 26 are mounted in a manner similar to the tail sluice trusses previously described, and are suspended by cables 26$^b$ operated by a winch to permit the outer ends to be raised and lowered about the inner pivotal mountings. The length of the stackers are approximately the same as the lower tail sluices 11. This permits the rocks and coarser gravels falling from the stackers to be filled in with the fines from the lower tail sluices 11; this being necessary to prevent drainage or escape through the gravel beds of water contained in the pond. The fines discharging from the upper decks into the upper tail sluices 10 and discharging at a point beyond the end of the lower sluices and the stackers will in this manner deposit a solid layer of fines, such as indicated at 30 on top of the rocks and gravel, in this manner forming a surface soil of sufficient depth to permit the land to be used for agricultural purposes.

The provision of the several stackers and tail sluices and the means by which their position may be adjusted permits an even distribution of all the tailings, thus leaving a level, even surface behind the dredge.

Suitable guy ropes, such as indicated at 32 are provided for the purpose of swinging the several tail sluices and stackers horizontally about their inner supports. Their position may in this manner be adjusted both vertically and horizontally.

Practically the stackers and sluices are in such proportion to each other in respect to length, that the rocks will fall first and spread out evenly over the bottom. The fine material from the lower deck passing through the lower sluices, will then fall and fill the voids between the rocks. The fine material from the upper decks passing through the upper sluices, will then fall as far to the rear of the lower sluices and stackers as is practical, so that a layer of fine material will be formed on top of the rocks. If the material is not spreading proportionally it can readily be seen that this may be remedied by adjusting the stackers and sluices either horizontally about their inner pivotal mountings, or vertically by means of the cables and connected winches.

The boulders, rock and coarser gravels larger than one-half inch in diameter that commonly pass through the revolving screen and cylinder are discharged into a hopper 35. The lower end of this hopper is divided into two sections which are so positioned as to separate and evenly deposit the material to the two stackers.

Referring to the diagrammatic view of Fig. 7, the swinging movement of the dredge about the spud can easily be seen. The sweep made by the digging and elevating mechanism is indicated by the arc 36. The swinging of the stackers is indicated by the respective dotted line arcs 37, the swinging of the lower sluices by the arcs 38 and the upper sluices by the arcs 39. From this diagrammatic view, it can easily be seen that the material first removed from the cut or face 36 is equally distributed and replaced over an area approximately the same, in such a manner that the major portion of the fines will be on top, where they will form a soil ideal for agricultural use. The land is in this manner not only leveled by the operation of the dredge, but also left in an improved condition, as the soils which were previously positioned a considerable distance below the surface are brought to the top, in this manner making possible the formation of a rich, virgin soil.

With dredges heretofore used there has been provided no means for causing a division of the fines and depositing a portion thereof together with the rocks and coarser material so as to fill all of the voids which would otherwise be formed.

The provision of the several tail sluices and stackers here shown forms a means by which the object sought is accomplished. I, therefore, do not wish to limit myself to any details of construction, finish or design.

Having thus described my invention, what I claim and desire to secure by Letters Patent is—

1. The combination with a dredge, of a pair of tail sluices, one mounted above the other, the upper being longer than the lower, a pivotal and turnable support for the inner end of said sluices, and means for swinging said sluices in a horizontal and vertical arc about the support.

2. The combination with a dredge, of means for depositing the rocks and gravel of the tailings behind the dredge, independent means for filling the voids between said rocks and gravel, and means for depositing the remaining fines of the tailings on top thereof.

3. The combination with a dredge, of means for separating the rocks and fines, means for depositing the rocks, means for dividing the fines, means for depositing a portion of the fines between said rocks, and means for depositing the remaining fines on top thereof.

4. The combination with a dredge, of a stacker, means for separating the coarse material in the dredged soil from the fines and distributing the coarse material to the stacker and dividing the fines, and a double decked tail sluice, said decks being of different lengths, and each of said sluices receiving a portion of said fines, said stacker and the lower tail sluice being adapted to deposit material at a substantially common point.

5. The combination with a dredge, of a stacker, means for separating the coarse material in the dredged soil from the fines and delivering the coarse material to the stacker and dividing the fines into two parts, and a pair of tail sluices of different lengths, each of said sluices receiving a part of said fines, said stacker and the shorter of said tail sluices being of substantially the same length so as to deposit material at a common point.

In testimony whereof I have hereunto set my hand in the presence of two subscribing witnesses.

EMERY OLIVER.

Witnesses:
E. M. MacKusier,
R. G. Clifford.